Figure 3:
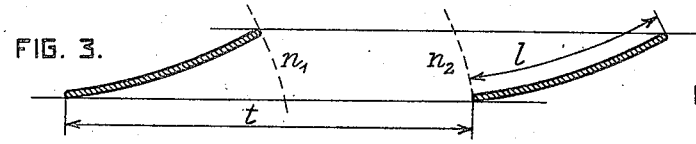

Apr. 10, 1923.
V. KAPLAN
WATER TURBINE
Filed Sept. 1, 1921
1,451,263
2 sheets-sheet 1
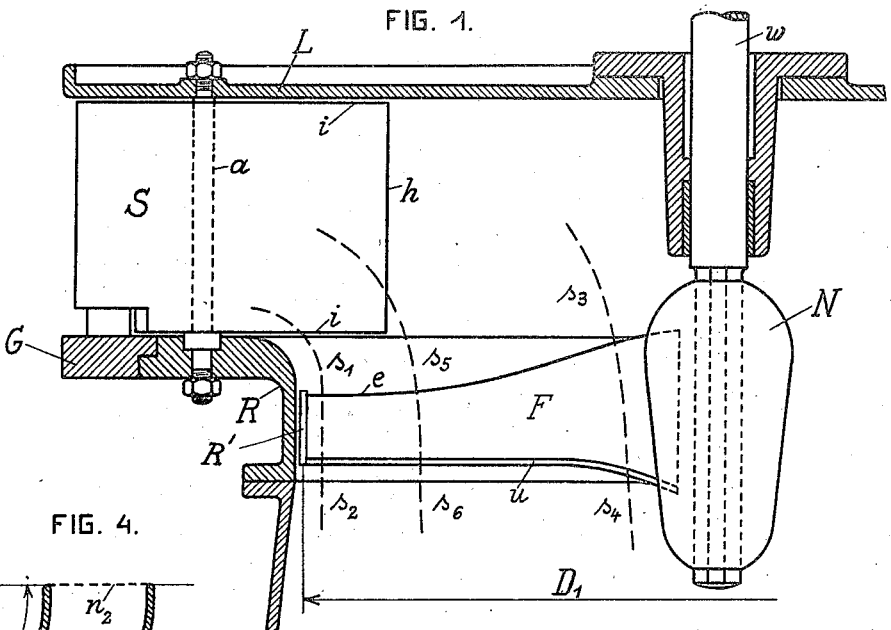
FIG. 1.
FIG. 4.
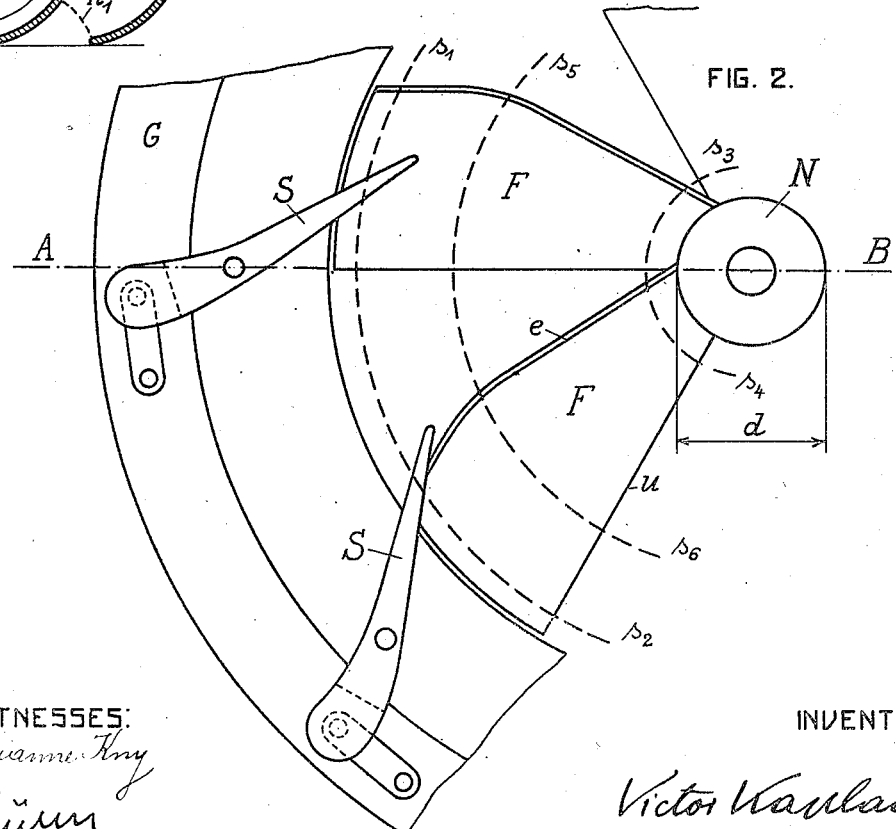
FIG. 2.
WITNESSES:
INVENTOR:
Victor Kaplan Apr. 10, 1923. 1,451,263

V. KAPLAN

WATER TURBINE

Filed Sept. 1, 1921  2 sheets-sheet 2

WITNESSES:

INVENTOR:

Victor Kaplan

Patented Apr. 10, 1923.

1,451,263

UNITED STATES PATENT OFFICE.

VICTOR KAPLAN, OF BRUNN, CZECHOSLOVAKIA.

WATER TURBINE.

Application filed September 1, 1921. Serial No. 497,749.

*To all whom it may concern:*

Be it known that I, VICTOR KAPLAN, a citizen of the State of Czechoslovakia, residing at the Deutsche Technische Hochschule at Brunn, Czechoslovakia, have invented certain new and useful Improvements in Water Turbines (for which I have applied for patents in the following countries: Austria, 30/10, 1915, and 25/9, 1916; Germany, 5/10, 16, and 26, 11, 17; Great Britain, 10/1, 21; France, 11/1, 21; Spain, 22/1, 21; Italy, 14/1, 21; Sweden, 12, 10, 16, and 23, 12, 20; Norway, 30/10, 16, and 19/3, 17; Switzerland, 22/7, 16; Czechoslovakia, 30/1, 20; Brazil), of which the following is a specification.

In my application Serial No. 865208 filed October 5, 1914 I have described and claimed a runner wheel for turbines, the smallest blade spacing of which, measured in a flow surface is so increased in relation to the true length of the blade profile measured in the same flow surface, that no cell is formed between two adjacent blades at least along a part of the blade surface. By such an arrangement the specific speed of the turbine is greater than that hitherto attained, and a runner wheel of simple and inexpensive construction is provided. The principal object of my present invention is to improve still further the guiding of water into the runner wheel for the purpose of obtaining a satisfactory efficiency even if the number of revolutions or the force at the periphery of the turbine varies in a high degree. Another object is to provide a runner wheel of strong construction which can work at a high water pressure without danger of a break-down. A further object is to provide a runner wheel, which can be utilized with a guide wheel of any desired construction.

It is well-known that in a high speed runner of the usual construction the water is admitted by a guide wheel having a radial or nearly radial entrance direction of water. But in many cases the radial inflow into the guide wheel is disadvantageous, especially if the water chamber cannot be suitably enlarged. For this reason a high speed runner of the usual construction cannot be successfully utilized. But a runner wheel of my invention can be combined with a guide wheel of any desired direction of inflow, thus allowing the construction of a water turbine giving satisfactory results, independent of the size and shape of the water chamber. These improvements are obtained by a special arrangement of the runner blades in relation to the turbine axis, by limiting the position of the wing-form only to the outer parts of said blades, and by reducing the diameter of the runner nave as it is hereinafter fully pointed out.

With these and other objects in view as will more fully hereinafter appear, my invention consists in certain novel features of construction and arrangement of a runner wheel for water turbines, hereinafter fully described, with reference to the accompanying drawings, and particularly pointed out in the claims.

In the drawings, in which I have shown several high speed runners in combination with guide wheels of different construction.

Figure 10:
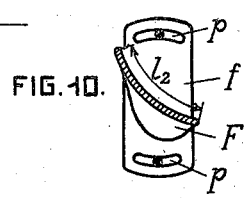
Figure 5:
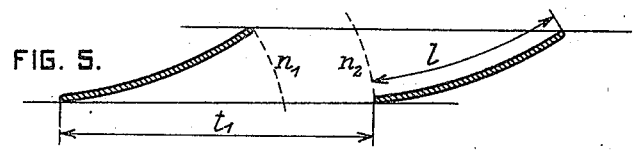
Figure 8:
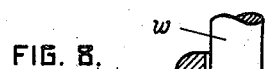
Figure 6:
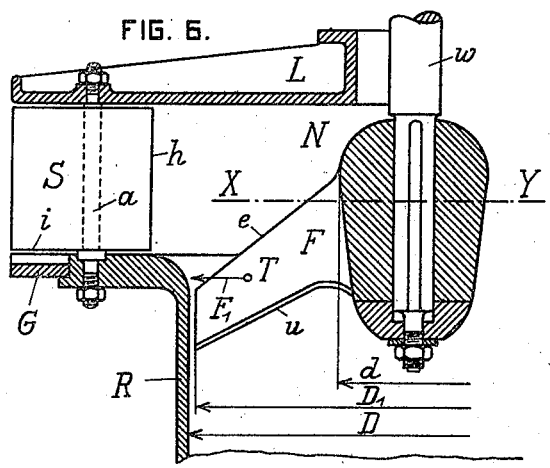
Figure 6:
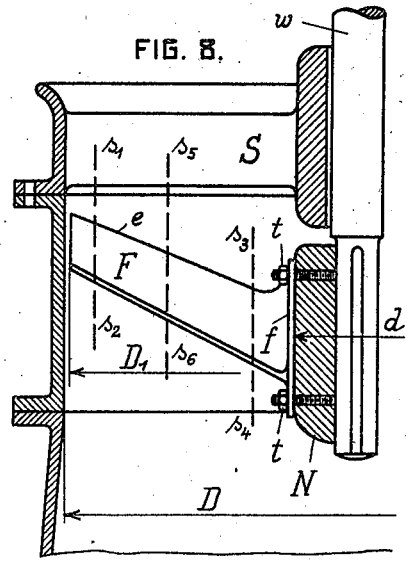
Figure 7:
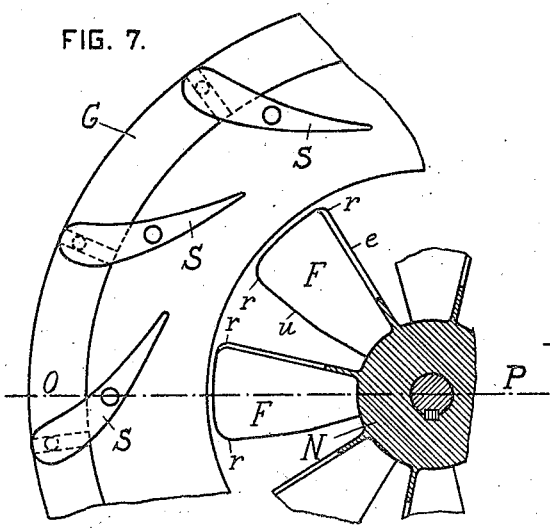
Figure 9:
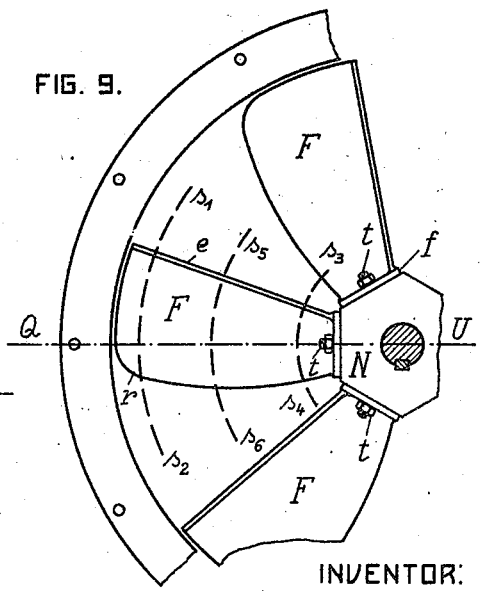
Figure 11:
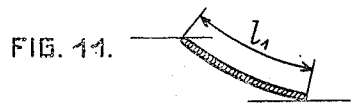

Fig. 1 is a vertical section through a runner wheel, the blades being directed approximately normal to the turbine axis, the water being admitted by a guide wheel with radial inflow; Fig. 2 shows the same wheel in plan view, the guide wheel cover L being removed; Fig. 3 is a section of two adjacent runner blades with a flow surface $(s_1\ s_2)$ drawn near the outer ends of said blades; Fig. 4 shows a similar section with a flow surface $(s_3\ s_4)$ drawn near the inner ends of said blades; Fig. 5 is a section between the said surfaces; Fig. 6 shows a runner wheel with blades inclined upwards and towards the turbine axis, the water being also admitted in this case by a guide wheel with radial inflow; Fig. 7 is a plan view of said turbine, the guide wheel cover L being removed and a section of the runner wheel being shown along line X—Y in Fig. 6; Fig. 8 shows the vertical section of a runner wheel but adapted with blades inclined downwards and towards the turbine axis, the water being admitted by an axial flow guide wheel; Fig. 9 is a plan view of said wheel, the guide wheel having been removed; Fig. 10 shows the means for adjusting the position of the blades, the blade being shown cut along $s_3$—$s_4$ in Fig. 8; Fig. 11 is a section of the blade F with the flow surface $s_1\ s_2$ (Figs. 8 and 9).

For a better understanding of the drawings it should be stated that in Figs. 1, 6 and 8 the guide vanes S and the runner blades F are drawn in radial projection. The profiles of the blade surfaces are shown developed in Figs. 3, 4, 5, 10 and 11. For this purpose the flow surfaces indicated by the lines $s_1$, $s_2$, $s_3$ $s_4$ and $s_5$ $s_6$ in Figs. 1, 2, 8, and 9 are intersected by the blade surfaces F, and the resulting section curves are shown spread out in a plane in Figs. 3, 4, 5, 10 and 11.

Figs. 1 and 2 show a guide wheel comprising a series of vanes S the bottom edges of which project over the wall of the suction pipe, and if required may be extended in close proximity to the axis. Each vane S is pivotally mounted on a fixed pivot $a$ (Fig. 1) the upper threaded end of which extends upwards through the cover L, while its lower end extends downwards through the horizontal flange of the suction pipe R near the governing ring G. The system of governing by means of movable guide vanes is the same as that used in similar regulating devices. The runner wheel is located at a suitable distance below the guide wheel, and comprises a hub N and a plurality of wing-like blades F secured to said hub and extending in a radial or nearly radial direction towards the wall of the suction pipe R. The wing-form of the runner blades described in my above said prior application has been modified according to my present invention as will now be explained with reference to Figs. 3, 4 and 5. By the terms "wing-form" or "wing-like" I mean blades in which the trajectories drawn from the points of the inlet and outlet edge perpendicularly to the lines of flow do not intersect the adjacent blade. If they do, a cell-shaped space is formed.

I have found and proved by experiments that the driving power transmitted by the runner blades can be increased if only the outer parts of said blades are given wing-shape, while their inner parts are provided with the usual cell-shaped spaces. Fig. 3 shows a blade profile lying in the flow surface $s_1$ $s_2$ (Fig. 1) of the outer parts of the blades, and it will be seen by the two normal trajectories $n_1$ and $n_2$ which do not intersect the adjacent blade profile, that the usual channel-shaped form of the runner blades is wholly avoided. Fig. 4 shows a blade profile lying in the flow surface $s_3$ $s_4$ (Fig. 1) of the inner blade parts, which is so enlarged in relation to the blade spacing measured in the same flow surface, that the quantity of fluid limited by the two outermost normal trajectories $n_1$ and $n_2$ (Fig. 4) is bounded by a channel-shaped space designated as a "cell". The blade spacing in a flow surface is measured in such a way, that the section of this flow surface with two adjacent blades is spread out in a plane and the distance of the inlet and outlet points respectively of the blade profiles is determined. Also, I have found that in water turbines the best results can be obtained, if the true length $l$ of the blade profile measured in a flow surface lying near the outer blade ends is half or approximately half of the blade spacing $t$ measured in the same flow-surface, and if its length does not materially alter at least along a part of the blade surface. In Fig. 1 I have limited said part by the two flow-surfaces $s_1$ $s_2$ and $s_5$ $s_6$ between which surfaces the profile length $l$ remains the same or approximately the same. For this reason the blade profile measured in the flow surfaces $s_5$ $s_6$ and spread out in Fig. 5 has the same or nearly the same length $l$ as the other profile lengths within said part and also the same as that measured in the flow surface $s_1$ $s_2$ (Fig. 3).

It is clear, that the above mentioned relation between the profile length and the blade spacing is only available for water turbines, and depends on the roughness of the blades, on the size of the runner wheel, on the angles required for said wheel, and on other working conditions of the turbine. But the said conditions are not so important that they could influence materially the above mentioned relation between the profile length and the blade spacing.

If the water pressure is normal the length of the blade profiles above indicated may be constant along the whole blade surface, Figs. 1 and 2 show such a construction, and it will be seen, from the figures that the true length of the blade profiles lying in the flow surfaces $s_3$ $s_4$ (Fig. 1) near the turbine axis, is also approximately of the same length $l$, as the profile lengths shown in Figs. 3 and 4. But if the runner wheel works under low water pressure the length of the blade profiles of the inner blade parts can be also reduced as is shown in Figs. 10 and 11. The length $l_1$ (Fig. 11) of the blade profile lying in the flow surface $s_1$ $s_2$ (Fig. 8) is approximately reduced to a half of the blade spacing measured in the same flow surface, but the length $l_2$ of the blade profile (Fig. 10) lying near the turbine axis is still more reduced. This arrangement reduces the losses caused by water friction but it is well understood that the reduction of the profile lengths must not be so great as to destroy the cell-shaped form of the inner blade parts. To increase the specific speed as far as possible it is advantageous to round off or to cut away one or both corners of the outer blade ends as shown at $r$ in Figs. 7 and 9. By such an arrangement the length of the blade profiles of the outermost blade parts is shorter than half of the greatest blade spacing. If such a high-speed runner is intended for working under low water pressure, the best results will be obtained if the profile lengths both of the outer parts and also of the inner parts of the runner blades are so far reduced that they are shorter than half of the greatest blade spacing.

The described arrangement of the runner blades reduces the friction losses on the outer parts of said blades and at the same time facilitates the guiding of water towards the hub, thus increasing the peripheral forces, towards said hub as required by theory. The same advantages can be obtained, if the runner blades are inclined upwards and towards the turbine axis as shown in Figs. 6 and 7. By such an arrangement the stress due to bending by water pressure is balanced by the centrifugal force $F_1$, the letter T indicating the point of application of said force. It will be seen, that the runner wheel having the characteristic features above mentioned is combined with a guide wheel of well-known construction, such as are used on Francis turbines. Owing to the guide vanes S the water is forced to enter and leave said vanes in a radial or nearly radial direction. In the bladeless space arranged between the guide wheel and the runner wheel the major portion of water is deflected, and flows in an axial or nearly axial direction into the runner wheel. Figs. 8 and 9 show a water turbine adapted for a runner wheel having generally the same characteristic features as described above but combined with an axial-flow guide wheel. For the purpose of providing a suitable bearing for the turbine shaft, the runner blades are inclined in an opposite direction to that in Fig. 6, but it is clear that, if required, the runner wheels shown in Figs. 1 and 6 could also be combined with an axial-flow guide wheel. In that case I fix the described wing-like blades in a runner hub N, the diameter of which is reduced as far as needed for suitably securing the blades. For this reason neither the inner wheel rim, nor the necessary clearance between said rim and the guide wheel rim formed by the usual axial flow runners, does exist in the turbine according to my present invention. Therefore, the admission of the water to my runner wheel can be effected with a guide wheel adapted for an axial, radial, inclined or curved flow of water with the same good results. For the purpose of reducing still further the losses caused by water friction, I have dispensed with the usual outer wheel rim, as shown in the drawings. The runner blades extend in close proximity to the suction tube, leaving a small clearance between the blade ends and the wall of the suction tube, thereby avoiding a direct contact between those parts. In case the runner wheel is endangered by a special high water pressure a narrow rim $R_1$ fitted round the outer blade ends may be provided; but it is clear that this rim must be as thin and narrow as security demands.

The securing of the runner blades to the hub N may be arranged in different ways. Figs. 1 and 2 show a runner wheel, the blades of which are cast in the hub, while Figs. 6 and 7 show a runner wheel made in one piece. Great advantage can be gained if said blades are adjustably arranged in the hub by special fastening means for the purpose of adjusting the blades in any desired position as shown in Figs. 8, 9 and 10. The blades F are provided with a flange $f$, into which slots $p$ are cut. The securing of the blades is carried out by screws which are passed through the slots and are screwed into the hub. Such an arrangement is specially advantageous if the supply of water is temporarily variable, because other conditions being unchanged, an altered supply of water requires also correspondingly altered blade angles. If therefore the blades should require adjustment for the purpose of utilizing an altered supply of water, it is only necessary to loosen the bolts, adjust the blades to the desired angle, and again secure the blades by the screws. This adjustment may, of course, be effected by any other suitable means. The method of adjusting the blades described above is advantageous if for example the owner of a hydraulic power station having plenty of water wishes to increase the output of his turbine plant at a minimum cost, or if the quantity of water needed for the turbine plant is sometimes too small for the effective operation of the runner wheel.

But the advantages produced by my present invention can be only attained if all the above described improvements are simultaneously applied. For this reason, a runner wheel according to this invention provided with an outer wheel rim of the usual construction would not give good results any more than a rimless wheel provided with cell-shaped blades. Again if the wing-like blades were fixed on an inner wheel rim of the usual construction, the results would be also unsatisfactory. It is well-known, that the desired increase of the specific number of revolutions causes large discharge losses, and therefore it is necessary to reduce said losses by suitable suction pipes, discharging the water with a low speed into the waste channel. It is clear, that a regular flow of water avoiding eddies and shock is essential. It is well-known that this requirement can be fulfilled by a guide wheel only if its vanes are accommodated to a smooth flow into the runner wheel.

A runner wheel constructed according to this invention can be utilized in all cases if a high specific speed and a considerable turning moment of the turbine are required. Especially in those cases, in which the usual form of the guide wheel cannot be utilized, a runner wheel of the above described shape, in combination with a guide wheel accommodated to the size and shape of the water chamber gives also satisfactory results. It is well-known than many water courses, cannot be utilized because the number of revolutions obtained by the usual form of high-speed runners is too small and therefore the cost of construction and erection of the plant is too expensive. By the use of this invention however economical operation will be obtained even with a low fall of water.

I claim as my invention—

1. In a water turbine, a runner wheel comprising a hub of small diameter and a plurality of blades secured to said hub, the outer portions of said blades having wing-shape and the inner portions cell-shape, in combination with a guide wheel of any desired construction and inflow direction.

2. In a water turbine, a runner wheel comprising a hub of small diameter and a plurality of wing-like blades secured to said hub, the true length of the profiles of said blades lying in the outer portions of the blade surface and being substantially equal to half of the largest blade spacing measured in the same portion of the blade surface.

3. In a water turbine, a runner wheel comprising a hub and a plurality of wing-like blades secured to said hub, the true length of the profiles of said blades being substantially one half of the blade spacing measured near the outer ends of said blades, and being practically constant along a portion of the plate surface.

4. A runner wheel for water turbines, comprising a hub and a plurality of wing-like blades, the true length of the profiles of said blades being practically constant along the entire blade surface and being substantially one half of the blade spacing measured near the outer ends of said blades.

5. A runner wheel for water turbines, comprising a hub and a plurality of wing-like blades secured to said hub, one or both corners of the outer ends of said blades being cut away, so that the true profile length of the outermost blade portions is shorter than one half of the largest blade spacing measured in said portions.

6. A runner wheel for water turbines, comprising a hub of small diameter and a plurality of wing-like blades secured to said hub, the length of the blade profiles of the outer and inner portions of said blades being shorter than one half of the greatest blade spacing.

7. A runner wheel for water turbines, comprising a hub and a plurality of wing-like blades, each blade having a flange adjustably secured to the said hub in combination with means for adjusting said blades.

8. A runner wheel for water turbines, comprising a hub of small diameter and a plurality of blades, the said blades having wing-shape on their outer portions and cell-shape on their inner portions, a thin narrow re-inforcing rim surrounding the blade ends.

In testimony whereof I affix my signature in presence of two witnesses.

VICTOR KAPLAN.

Witnesses:
 NOVENANNE KNY,
 D. STUTTIER,